United States Patent [19]

Tenney et al.

[11] 4,410,692

[45] Oct. 18, 1983

[54] PRECIPITATION OF POLYMERIC CYCLOOLEFINS

[75] Inventors: Linwood P. Tenney, Hudson; Gerald V. Wootton, Akron, both of Ohio

[73] Assignee: The B. F. Goodrich Company, Akron, Ohio

[21] Appl. No.: 376,367

[22] Filed: May 10, 1982

[51] Int. Cl.$^3$ .................................................. C08F 6/12
[52] U.S. Cl. .................................. 528/495; 526/281; 526/283; 528/496
[58] Field of Search ............................... 528/495, 496

[56] References Cited

U.S. PATENT DOCUMENTS 4,069,376 1/1978 Minchak .............................. 526/280

Primary Examiner—Stanford M. Levin
Attorney, Agent, or Firm—George A. Kap

[57] ABSTRACT

Process for precipitating a polycycloolefin from polymer cement comprising mixing said cement with a sufficient amount of a lower alcohol and water precipitant to cause said polymer to precipitate, and separating said polymer from the remaining liquid phase, the polymer cement having about 15 to 80% solids concentration and being a honey-like solution in a nonpolar hydrocarbon solvent of a polymer formed by ring opening polymerization of at least one monomer containing at least one norbornene group. The precipitation process can be either batch or continuous throughout.

10 Claims, 2 Drawing Figures

PRECIPITATION OF POLYMERIC CYCLOOLEFINS

BACKGROUND OF THE INVENTION

In the solution ring opening polymerization of cycloolefins, the product discharged from the reactor is a honey-like cement that consists principally of a cyclic nonpolar carrier solvent in which the polymer is dissolved. The polymer content is normally on the order of about 15% by weight. The polymer can be any of the family of polymers that are made by homopolymerization or copolymerization of one or more of cycloolefins that contain the norbornene group. Polymerization can be either batch or continuous.

After the honey-like cement is prepared, it is necessary to separate the polymer from its carrier solvent. In the past, steam stripping has been used exclusively in plant operations to extract the polymer from the carrier solvent. In steam stripping, the cement is injected into a jet of steam that is directed into a vessel containing hot water. As contact is made between the cement and the jet of steam, the carrier solvent is flashed off as vapor, depositing the polymers in particle form in the hot water.

Steam stripping has a number of serious disadvantages. It produces a product of relatively large, coarse and variable particle size. The product contains a substantial amount of occluded water that makes it extremely difficult to dry. It produces a product that retains significant quantities of residual high boiling monomers and other residues that include high boiling reaction products and catalyst residue, all of which adversely affect the quality of the final product. Steam stripping has the inherent carry-over problem of polymer fines with the solvent vapor and steam that is continuously discharged. This carry-over results in severe plugging in the solvent recovery system. Finally, steam stripping requires large volumes of steam, far in excess of that required to vaporize the solvent in order to produce a particulate product. Steam stripping, therefore, is an inefficient, expensive, and energy-wasteful operation.

It has been a common practice to reduce impurities in the polymers of cycloolefins by water washing the cements before steam stripping. In this way, effects of certain water-sensitive impurities are eliminated. Water washing has not been practical since large volumes of contaminated water were produced that had to be disposed without creating an environmental problem.

More recently, an alternate approach was discovered for isolating polymers of cycloolefins from the carrier solvent. Pursuant to this approach, the cement is mixed in a high shear mixer with a nonsolvent in the volume ratio of about 3 to 1 nonsolvent to cement whereby the polymer precipitates out. A nonsolvent is a liquid that is miscible with the nonpolar solvent that is used in the polymerization reaction but is a nonsolvent for the polymer. Examples of suitable nonsolvents include, ethanol, propanol, isopropanol, and the like. Although on some occasions this recovery procedure produced granular, easy-to-dry product having bulk density of about 0.144 g/cc or 9 lb/ft$^3$, these results could not be reliably reproduced. What was obtained normally was a clump-like product of fine, irregular fluffy microfibers that packed cotton-like when filtered and was difficult to dry and handle, the dry product having bulk density below 0.08 g/cc or 5 lb/ft$^3$.

When polymer cement is precipitated or coagulated in a nonsolvent medium, the high polymers appear to precipitate from and the oligomers, catalyst residues, and the like, remain solubilized in the mixed nonsolvent-solvent medium. Since a substantial portion of the impurities are soluble in the nonsolvent, this recovery process succeeded in removing the bulk of the impurities from the polymer. However, this approach was not entirely successful since large volumes of contaminated liquid was produced composed primarily of nonsolvent, cyclic nonpolar reaction solvent, and impurities that included residual shortstop for the polymerization reaction, adducts of the shortstop with catalyst residues, residual catalyst components, oligomers, etc. Solvent recovery of the large volume of nonsolvent—solvent liquid is difficult and expensive and especially complicated using water-free nonsolvents which form azeotropes with water and the solvent.

More specifically, in reference to the use of a nonsolvent in polymer extraction, at bottom of col. 4 of the Minchak U.S. Pat. No. 4,069,376 it is disclosed that a polymer of one or more cycloolefins can be isolated by precipitation using a nonsolvent selected from lower alcohols such as methanol, ethanol, isopropanol, and the like. This is a known method wherein polymer cement and a nonsolvent are mixed in a high-shear intensive mixer whereby a slurry is formed. The slurry is then conveyed to a slurry tank where it is further agitated at ambient temperature, and from the slurry tank the slurry is taken to a centrifuge or a filter where the polymer is separated and taken to a drying operation whereas the filtrate is pumped to recovery where the cyclic nonpolar solvent is separated from the nonsolvent and recovered. The filtrate is composed essentially of the cyclic nonpolar solvent and the nonsolvent hydrocarbon.

Recovery of the cyclic nonpolar solvent, modifier and the water-free nonsolvent is complicated, requiring extraction and distillation operations, as illustrated in FIG. 1 where stream 10 enters extraction vessel 12 at the lower portion thereof and is countercurrently extracted by water stream 14 that enters from the top. Extraction efficiency may be improved substantially using a Podbielniak ® centrifugal extractor or other similar mechanical extraction devices. Stream 10 is composed of the filtrate stream from the centrifuge in the polymer extraction process as well as a ternary azeotrope. For purposes of illustration, cyclohexane is used herein as an example of a suitable cyclic nonpolar solvent, 1-hexene as the modifier, and ethanol is used as an example of a suitable nonsolvent. Stream 16, composed of cyclohexane, 1-hexene, and a trace of water and nonsolvent is taken off the top of extractor 12 and conveyed to distillation unit or still 18 where high boiling fraction 20 is taken off the bottom as a waste stream, 1-hexene and traces of water and nonsolvent stream 22 is taken off the top and returned to process following further treatment, and cyclohexane stream 23 is taken off the side and returned to process. Alternately, with proper operation and plant design, cyclohexane can be taken off the top of still 18 as part of stream 22, thus eliminating stream 23. Stream 24, composed of ethanol and water, is taken off the bottom of extractor 12 and passed to distillation unit 26 where it is separated into an overhead stream 28 composed of ethanol-water azeotrope and a bottom stream 30 of hot water.

Extractive distillation unit 32 is provided for the purpose of recovering water-free ethanol from the ethanol-water azeotrope with the aid of a third hydrocarbon, cyclohexane, in this case. Ethanol-water azeotrope stream 28 is augmented by addition thereto of cyclohexane through line 34 and the combined stream 36 is introduced into extractive distillation column 32 where ethanol is recovered from the bottom as stream 38, which is returned to the process, and where vapor stream 40 is taken off the top and conveyed to condenser 42 where it is converted to a condensate stream 44. The condensate stream is a ternary azeotrope of cyclohexane, ethanol, and water which is recycled to stream 10. Stream 46 of high boilers is taken from the bottom of column 32 as waste. Line 29 is nonexistent when a water-free nonsolvent hydrocarbon is used in the polymer extraction process.

SUMMARY OF THE INVENTION

This invention relates to the use of water and a nonsolvent in the precipitation of the polymeric cycloolefins from polymer cements, the polymers being prepared by ring opening polymerization of at least one cycloolefin containing the norbornene group. The polymer cements consist essentially of the polycycloolefins dissolved in nonpolar solvents. The precipitation process can be conducted in batchwise segments or continuously throughout.

DETAILED DESCRIPTION OF THE INVENTION

Figure 1:
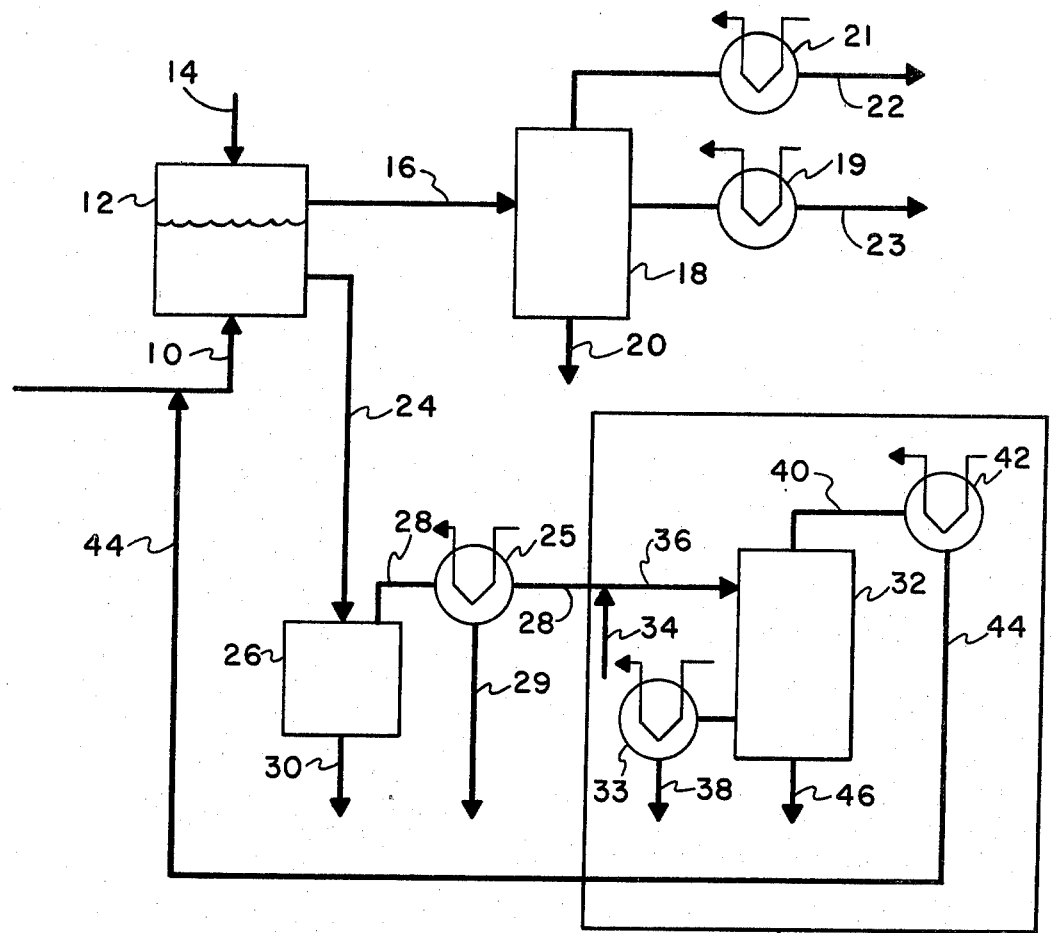
FIG. 1 is a flow diagram illustrating the prior art method of continuously refining a filtrate stream to separate and recover a cyclic nonpolar solvent, such as cyclohexane, and a nonsolvent, such as ethanol, that are returned to process; this figure also demonstrates that by using water and a nonsolvent in the precipitation of polymeric cycloolefins, the recovery procedure can be vastly simplified by eliminating the matter enclosed in the box identified as 48 and by conveying stream 28 through line 29 directly to precipitation as shown.

In the precipitation of polymeric cycloolefin cements, it was unexpectedly discovered that water together with the nonsolvents performed as well as pure nonsolvents themselves. This is a totally unexpected result inasmuch as water would be expected to substantially reduce the solubility of a cyclic nonpolar solvent in a nonsolvent, which principle is regularly employed to separate nonsolvents from hydrocarbons by water extraction, as shown in FIG. 1. However, this is not observed to any extent in the precipitation of polymeric cycloolefins and subsequent extraction procedures.

The use of water with a nonsolvent instead of the nonsolvent itself in the coagulation of polycyloolefinic cements also provides other advantages. One such advantage resides in the omission of the extractive distillation, condensation, and conveyance of the ternary azeotrope stream 44 to the stream 10, all of which is enclosed in box 48, as illustrated in FIG. 1. This permits the conveyance of the azeotrope stream 28 directly to precipitation via line 29, and this in turn, eliminates recirculation of the ternary azeotrope in the system. Furthermore, the extractive power of a nonsolvent in a water-nonsolvent mixture for the cyclic nonpolar hydrocarbon solvent, as well as for the molecular weight modifier and impurities in the cement, is not diminished and may be markedly increased.

This invention, therefore, relates to the use of water and a nonsolvent, such as a lower saturated alcohol, to precipitate or coagulate polycycloolefin from polymer cements.

Polymers of cyclic olefins that contain the norbornene moiety can be made by ring opening polymerization of the cyclic olefins in the presence of a metathesis catalyst comprising at least one alkylaluminum halide co-catalyst and at least one tungsten or molybdenum compound catalyst. Tungsten and molybdenum in the metal compound catalyst can be the cation, such as in a tungsten or molybdenum halide, or the anion as in a tungstate or a molybdate. Polymerization is accomplished by mixing in a reactor a monomeric cyclic olefin, or a mixture thereof with or without other copolymerizable monomers, with a cyclic nonpolar hydrocarbon solvent. A molecular weight modifier, selected from nonconjugated acyclic olefins, is then added to the reactor followed by an alkylaluminum halide cocatalyst and a tungsten or molybdenum compound catalyst. The polymerization reaction is conducted at 0° to 200° C., preferably 25° to 100° C., with stirring and produces little heat. Reaction time to completion is on the order of less than 2 hours.

Polymerization of cycloolefins may be conducted either batchwise or continuously. The precipitation processes described hereunder will perform equally well in either case, dispite some differences in chemical make up of cements resulting from inherent kinetic differences existing between the two reaction modes. Continuous polymerization requires substantially less molecular weight modifier and catalyst and produces polymers of narrower molecular weight distribution than batch operation. For these and other practical considerations of a technical nature not important to the embodiment of this invention, continuous polymerization is the preferred method most regularly employed for process operations.

Reaction product that is recovered directly from the reactor is a smooth, viscous polymer cement of honey-like consistency that comprises a polymer dissolved in a solvent. Polymer or solids concentration in the cement is about 15% and dilute solution viscosity of the polymer is normally in the range of about 0.1 to 3. Dilute solution viscosity is a measure of viscosity of a solution of 0.25 gram of polymer in one deciliter of toluene at 25° C. The polymer cement can be preconcentrated from about 15% solids to at least about 20% solids and up to about 80% solids. Preconcentration can be accomplished by mixing the cement with about 0.2 to 1 volume of a nonsolvent per 1 volume of cement.

The preconcentration step is optional but when employed, affords the special advantage of removing residual impurities which can be present in the recycle to the precipitation process. In the absence of preconcentration, an obvious alternative is to send the stream to recovery for this purpose, if desired.

The norbornene-type monomers or cycloolefins that can be polymerized in accordance with the process described herein are characterized by the presence of the following norbornene group, defined by Formula I, that can be substituted or unsubstituted:

(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Preferred monomers of the norbornene-type are those defined by the following formulas II and III, each containing at least one norbornene group:

 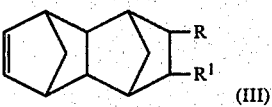
(II)  (III)

where R and $R^1$ are independently selected from hydrogen, alkyl, and aryl groups of 1 to 20 carbon atoms, and saturated and unsaturated cyclic groups of 3 to 12 carbon atoms formed by R and $R^1$ together with the two ring carbon atoms connected thereto. In a preferred embodiment, R and $R^1$ are independently selected from hydrogen and alkyl groups of 1 to 2 carbon atoms. Examples of monomers referred to herein include dicyclopentadiene, methyltetracyclododecene, 2-norbornene and other norbornene monomers such as 5-methyl-2-norbornene, 5,6-dimethyl-2-norbornene, 5-isopropyl-2-norbornene, 5-ethyl-2-norbornene, 5-butyl-2-norbornene, 5-hexyl-2-norbornene, 5-octyl-2-norbornene, and 5-dodecyl-2-norbornene.

Especially contemplated herein are homopolymers, copolymers and terpolymers of methylnorbornene, methyltetracyclododecene, and dicyclopentadiene, and preferably homopolymers of methyltetracyclododecene and copolymers of methyltetracyclododecene and methylnorbornene. The copolymers contain 1 to 75% by weight, preferably 10 to 30%, of polymerized methylnorbornene with remainder being methyltetracyclododecene whereas the terpolymers contain 1 to 75% by weight, preferably 1 to 45%, of polymerized methylnorbornene and 25 to 98% by weight, preferably 50 to 98%, of polymerized methyltetracyclododecene, with remainder being polymerized dicyclopentadiene. The norbornene-type monomers, or a mixture thereof, can contain up to about 20% by weight of at least one other copolymerizable monomer.

The preferred catalyst employed in the dispersion of cycloolefins is a combination of an aluminum halide with elemental halide or an alkylaluminum halide cocatalyst and a tungsten or a molybdenum compound catalyst. The tungsten and molybdenum in the metal compound catalyst can be the cation, such as in a tungsten or a molybdenum halide, or the anion, as in a tungstate or a molybdate.

The useful molybdenum and tungsten compound catalysts include molybdenum and tungsten halides such as molybdenum petachloride, molybdenum hexachloride, molybdenum pentabromide, molybdenum hexafluoride, molybdenum pentaiodide, tungsten hexachloride, tungsten hexafluoride, and the like. Preferred catalysts are the molybdenum halides, especially molybdenum pentachloride.

The alkylaluminum halide cocatalysts are selected from aluminum halides $RAlX_2$, $R_2AlX$, $R_3Al_2X_3$, $R_3Al$, $AlX_3$, and mixtures thereof. In the formulas for the aluminum halide catalysts, R is an alkyl radical containing 1 to 12 carbon atoms, preferably about 2 to 4 carbon atoms, and X is a halogen selected from chlorine, iodine, bromine and fluorine. Specific examples of such aluminum halides include ethylaluminum dichloride, diethylaluminum monochloride, ethylaluminum sesquichloride, diethylaluminum iodide, ethylaluminum diiodide, trialkylaluminum compound with elemental iodine, propylaluminum dichloride, propylaluminum diiodide, isobutylaluminum dichloride, ethylaluminum dibromide, methylaluminum sesquichloride, and methylaluminum sesquibromide.

Although aluminum is the preferred reducing agent in the alkylaluminum halide cocatalysts, other organometallic halide reducing agents can function as well. Metals that form suitable organometallic cocatalysts include lithium, magnesium, boron, lead, zinc, tin, silicon and germanium. Also, the metallic hydrides can be substituted in whole or in part for the organometallic cocatalysts.

The molybdenum or tungsten compound catalyst, or a mixture thereof, is employed at a level of about 0.01 to 50 millimoles molybdenum or tungsten per mole of total monomer, preferably 0.1 to 10 millimoles. The molar ratio of the alkylaluminum halide to the molybdenum and/or tungsten compound catalyst is not critical and can be in the range of about 200:1 or more to 1:10, preferably from 10:1 to 2:1 of aluminum to molybdenum or tungsten.

The use of polymerization reaction solvent in the process of this invention is required. Suitable nonpolar solvents, in which the polymers described herein are soluble, include aliphatic and cycloaliphatic hydrocarbon solvents containing 4 to 10 carbon atoms such as butane, pentane, hexane, heptane, octane, cyclohexane, cyclohexene, cyclooctane and the like; aromatic hydrocarbon solvents containing 6 to 14 carbon atoms which are liquid or easily liquified such as benzene, toluene, naphthalene and the like; and substituted hydrocarbons wherein the substituents are inert, such as dichloromethane, chloroform, chlorobenzene, dichlorobenzene, and the like. In any case, it should be obvious that in the process of this invention, it is important that the solvent employed be miscible with the water-nonsolvent so as to effect precipitation of the polymer in the intensive mixer, as described herein. Cyclohexane was found to be an excellent solvent. The solvent can be added at any point in the charging procedure, but a portion, preferably 0.1 to 10% of the total solvent, is used to dissolve the catalyst and the remainder added before the catalyst solution. Generally ½ to 2 liters of solvent is used per 100 grams of monomer.

A polymerization activator can be used but is generally not needed. Activation can be obtained by using air or peroxide or a hydroperoxide, especially the organic peroxides such as benzoyl peroxide. The activator can be employed in the range of up to 3 moles, preferably up to 1 mole, per mole of the alkylaluminum halide cocatalyst. The activator can be added at any point in the charging procedure but is preferably added last or with the tungsten or molybdenum compound catalyst.

At least one nonconjugated acyclic olefin can be used as a molecular weight modifier having at least one hydrogen on each double-bonded carbon atom and containing 2 to 12 carbon atoms, more preferably 3 to 8 carbon atoms. Examples of suitable acyclic olefins include 1-olefins, 2-olefins, 3-olefins, nonconjugated diolefins, and nonconjugated triolefins. More preferably, the nonconjugated acyclic olefins are selected from 1-olefins containing 3 to 8 carbon atoms such as 1-butene, 3-methyl-1-butene, 1-pentene, 1-hexene, 4-methyl-1-pentene, and the like. Compounds not having hydrogen atoms on double-bonded carbons are unreactive. In the process of this invention, it is important that the acyclic olefin employed boil at or below the boiling temperature of the water-nonsolvent binary azeotrope either by itself or in azeotropic composition with other system components present in the slurry tank.

The nonconjugated acyclic olefin can be used at a level of about 0.0001 to 1 mole per mole of the monomer charge. The nonconjugated acyclic olefin can be charged directly or in solution at any point in the charging procedure, but it is preferably charged along with the monomers. When charged last, the nonconjugated acyclic olefin is preferably charged before the reaction begins.

The monomers can be added at any point in the charging procedure. Normally, however, for continuous polymerization, the monomers, the solvent and the nonconjugated acyclic olefin are added to the reactor as a mixture together with the alkylaluminum halide cocatalyst. The tungsten or molybdenum compound catalyst is added separately in a hydrocarbon solvent. Completion of the polymerization reaction is indicated by the disappearance of the monomer in the charge, as monitored by gas chromatography.

The nonsolvent that is used with water to precipitate polymer cement is a liquid that is miscible with the nonpolar solvent used in the polymerization reaction of the monomers containing the norbornene group. However, the nonsolvent is not a solvent for the polymer. Suitable nonsolvents include alcohols containing 2 to 8 carbon atoms, preferably lower alkyl alcohols of about 2 to 5 carbon atoms. Specific examples of suitable nonsolvents include ethyl alcohol, propyl alcohol, allyl alcohol, isopropyl alcohol, butyl alcohol, isobutyl alcohol, sec-butyl alcohol, t-amyl alcohol, and the like. Preferred nonsolvents are the lower saturated and unsaturated alcohols containing 2 to 5 carbon atoms. Amount of water used relative to the nonsolvent preferably corresponds to the azeotropic composition of nonsolvent/water azeotropes. This provides advantages in recovery operation where the azeotrope can be easily distilled-off and returned to process. It should be understood, however, that more or less water can be used without significantly altering recovery operation since the azeotrope will be distilled-off before excess water or excess nonsolvent. Amount of water relative to the nonsolvent should be sufficient to distill-off enough nonsolvent-water azeotrope in the recovery operation for recycle to the precipitation process to run the precipitation process continuously and more preferably, to run both the precipitation process and the recovery operation continuously.

Some of the more common azeotropes include the ethanol-water azeotrope containing 4% water by weight, isopropanol-water azeotrope containing about 12.5% water, allyl alcohol-water azeotrope containing 27.7% water, propanol-water azeotrope containing 28.3% water, butanol-water azeotrope containing 42.5% water, secbutanol-water azeotrope containing 27.3% water, isobutanol-water azeotrope containing 33% water, and t-amyl alcohol-water containing 27.5% water.

The volume ratio of nonsolvent and water to polymer cement can vary from about 2/1 to 15/1, preferably 3/1 to 8/1 for 15% total solids polymer cements and higher ratios for preconcentrated polymer cements, normally about 10/1. Process economies strongly favor the lower end of the range, although at higher levels, coalescence of polymer particles in subsequent process steps is reduced. Amount of the alcohol and water precipitant will also depend on the solids concentration of the cement, with the more concentrated cement requiring more precipitant per volume. The polymer generally precipitates out in the form of fluffy clumps composed of a multitude of tangled fibrous strands that are normally smaller than 1 millimeter in length. The polymer is compounded with various additives after drying.

Figure 2:
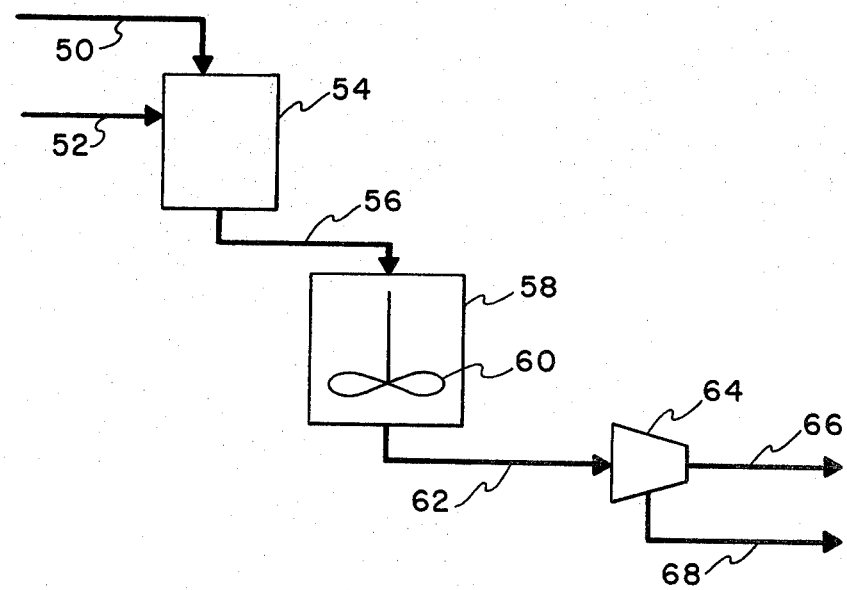
FIG. 2 is a flow diagram that illustrates continuous precipitation of a polycycloolefin cement with water and a nonsolvent, such as ethanol.

The precipitation, extraction, and recovery processes described hereunder may be conducted either in batchwise segments or wholly continuously as shown in the accompanying FIGS. 1 and 2. For practical and technical reasons not important to the embodiment of this invention, continuous mode is the preferred method most regularly employed for process operations.

Precipitation of a polycycloolefin from the polymer cement is illustrated in FIG. 2. As already described, the cement can contain about 15% solids or it can be a preconcentrated cement, in which case, solids concentration thereof is at least about 20% and up to about 80%. Of 3.05 kg of cement, about 2.6 kg thereof is a nonpolar solvent and a small amount of a molecular weight modifier, and about 0.45 kg is polymer. Preconcentrated cement, of course, would contain more polymer relative to solvent.

Referring to FIG. 2, ethanol and water azeotrope stream 50, and cement stream 52, are introduced into a high shear, high intensity mixer 54 where they are mixed and then conveyed through line 56 to slurry tank 58 provided with agitator 60. The polymer in the cement is precipitated on contact with the ethanol and water precipitant forming a polymer slurry composed essentially of polymer particles dispersed in a liquid medium containing ethanol, water and cyclohexane. Further mixing of the cement with the precipitant in the slurry tank enhances the extraction of cyclohexane from the polymer particles. Precipitation can be effected at a temperature ranging from just above freezing to just below boiling point of the polymer slurry, although, as already noted, precipitation can easily take place at ambient temperature of about 20° C. Generally speaking, precipitation can be effected in the temperature range of about 20° to 60° C. From slurry tank 58, the slurry is pumped through line 62 to centrifuge 64 where the slurry is separated into polymer stream 66 that is subsequently dried, and stream 68, composed of cyclohexane, water and ethanol, that is pumped to the recovery operation illustrated in FIG. 1 and described earlier.

The polymers described herein can be injection molded to produce machine parts, containers, electronic components, etc., or they can be extruded into profile shapes, sheets, rods, tubular products, and other mechanical products obtained by pressing, stamping, and other fabricating means. It should be understood, however, that prior to fabrication, the polymers described herein are compounded in a manner that is well known in the art.

The following example is set forth to illustrate the invention disclosed herein in greater detail in reference to the use of specific materials and conditions.

EXAMPLE I

The cement used herein had about 15% solids concentration and was essentially a polymer dissolved in cyclohexane solvent. The polymer was a 90/10 copolymer, on weight basis, of methyltetracyclododecene and methylnorbornene with a dilute solution viscosity of 0.4.

The cement was initially purified and preconcentrated by mixing it with 40 weight parts of ethanol and water per 100 weight parts of cement. The relative amounts of ethanol and water corresponded to the approximate azeotropic composition of 96/4, on weight basis. After mixing, the mixture was allowed to stand whereby phase separation took place. The upper phase was removed and discarded whereas the lower phase was diluted with cyclohexane to 13.6% solids to facilitate handling of the cement in subsequent operations. Purification of the cement was thus accomplished by removing, in this manner, monomer residuals and other hydrocarbon impurities that solubilized in the upper phase. It should be noted that, due to the limited amount of ethanol and water used, precipitation of the polymer did not take place at this stage.

Precipitation of the polymer was accomplished by mixing 0.41 kg per minute of the polymer cement with 3.1 kg per minute of ethanol and water precipitant, relative amounts of which corresponded to their azeotropic composition, i.e., 96/4 ratio of ethanol to water. Mixing was done at room temperature in a 2-inch diameter Eppenbach high intensity, high shear mixer. On mixing the cement with the precipitant, a polymer slurry was obtained consisting essentially of solid polymer particles dispersed in a liquid phase containing cyclohexane, ethanol, and water. The polymer slurry was conveyed to a slurry tank where it was agitated to hold the polymer particles in suspension and to complete the extraction of cyclohexane from the particles, and then was taken to a filter where about 0.23 kg per minute of wet copolymer and about 3.3 kg per minute of filtrate were separated. The wet polymer, containing 76% by weight of liquid was dried to less than 1% liquid in an oven maintained at 200° F. for 26 hours under a vacuum of 30 mm Hg with a nitrogen sweep.

We claim:

1. Process for precipitating a polymer from a cement comprising said polymer dissolved in a solvent, said process comprising contacting said cement with a sufficient amount of water and a nonsolvent precipitant whereby said polymer precipitates and forms a dispersion of solid polymer particles dispersed in a liquid phase containing said solvent, nonsolvent, and water; and separating said polymer from the dispersion; said nonsolvent, being miscible with said solvent but being a nonsolvent for said polymer, is selected from alcohols containing 2 to 8 carbon atoms and said polymer being a reaction product formed by ring opening polymerization of at least one norbornene-type monomer.

2. Process of claim 1 wherein said nonsolvent is a liquid, amount of said water and nonsolvent precipitant relative to said cement being in the ratio of from 2/1 to 15/1, on volume basis, and said solvent is miscible with water and said nonsolvent.

3. Process of claim 2 wherein said polymer has dilute solution viscosity of about 0.1 to 3 and is selected from homopolymers, copolymers and terpolymers of methylnorbornene, methyltetracyclododecene and dicyclopentadiene, the precipitation being accomplished in the temperature range from above freezing to below boiling temperatures of the system.

4. Process of claim 3 wherein said copolymers contain 10 to 30% by weight polymerized methylnorbornene with remainder being methyltetracyclododecene and said terpolymers contain 1 to 45% by weight polymerized methylnorbornene, 50 to 98% by weight polymerized methyltetracyclododecene, with remainder being polymerized dicyclopentadiene; the temperature of said polymer cement and said precipitant on mixing is in the range of about 20° to 60° C.

5. Process of claim 2 wherein said alcohols are saturated lower alcohols containing 2 to 5 carbon atoms; and said polymer has dilute solution viscosity of about 0.1 to 3 and is selected from homopolymers, copolymers and terpolymers or methylnorbornene, methyltetracyclododecene and dicyclopentadiene; the precipitation is accomplished in the temperature range from above freezing to below boiling temperatures of the system; and amount of water relative to said nonsolvent corresponds approximately to the nonsolvent/water azeotrope.

6. Process of claim 5 wherein the volume ratio of said azeotrope to said cement is in the range of about 3/1 to 8/1.

7. Process of claim 5 that includes the steps of separating said polymer from the liquid phase, conveying said liquid phase from the separating means to a recovery operation, separating said solvent from the nonsolvent/water azeotrope and recycling said azeotrope to process.

8. Process of claim 7 wherein the ratio of said water and nonsolvent precipitant to said cement is in the range of about 3/1 to 8/1.

9. Process of claim 7 wherein said cement has a solids concentration of about 20 to 80%, precipitation is effected at ambient temperature, and said nonsolvent is selected from ethanol and isopropanol.

10. Process of claim 9 wherein said cement is of a honey-like consistency; said solvent being a cyclic nonpolar hydrocarbon liquid selected from cyclohexane, toluene, and benzene, and the polymer precipitates in the form of fluffy clumps composed of a multitude of tangled fiberous strands that are smaller than 1 millimeter in length.

* * * * *